United States Patent
Kikkawa et al.

(10) Patent No.: US 12,502,261 B2
(45) Date of Patent: Dec. 23, 2025

(54) INTERDENTAL CLEANING TOOL

(71) Applicant: KOBAYASHI PHARMACEUTICAL CO., LTD., Osaka (JP)

(72) Inventors: Tasuku Kikkawa, Ibaraki (JP); Yuji Saiki, Ibaraki (JP); Tomokazu Yoshida, Ibaraki (JP)

(73) Assignee: KOBAYASHI PHARMACEUTICAL CO., LTD., Osaka (JP)

( * ) Notice: Subject to any disclaimer, the term of this patent is extended or adjusted under 35 U.S.C. 154(b) by 695 days.

(21) Appl. No.: 17/256,371

(22) PCT Filed: May 16, 2019

(86) PCT No.: PCT/JP2019/019549
§ 371 (c)(1),
(2) Date: May 17, 2021

(87) PCT Pub. No.: WO2020/003798
PCT Pub. Date: Jan. 2, 2020

(65) Prior Publication Data
US 2021/0267732 A1 Sep. 2, 2021

(30) Foreign Application Priority Data
Jun. 29, 2018 (JP) ................. 2018-125596

(51) Int. Cl.
*A61C 15/02* (2006.01)
*A46B 5/02* (2006.01)

(52) U.S. Cl.
CPC ............ *A61C 15/02* (2013.01); *A46B 5/02* (2013.01); *A46B 2200/108* (2013.01)

(58) Field of Classification Search
CPC ......... A61C 15/00; A61C 15/02; A61C 15/04; A61C 15/046; A46B 5/02; A46B 15/0069;
(Continued)

(56) References Cited

U.S. PATENT DOCUMENTS

2004/0187887 A1* 9/2004 Beckman ........... A46B 15/0055
132/309
2015/0114428 A1* 4/2015 Kato ................... B29C 45/0441
264/243
(Continued)

FOREIGN PATENT DOCUMENTS

JP 2016087362 A * 5/2016
JP 2016131899 A * 7/2016 ............ A46B 5/00
(Continued)

OTHER PUBLICATIONS

JP2016087362A. Translation (Year: 2016).*
(Continued)

*Primary Examiner* — Rachel R Steitz
*Assistant Examiner* — Karim Asqiriba
(74) *Attorney, Agent, or Firm* — Birch, Stewart, Kolasch & Birch, LLP (57) ABSTRACT

Provided is an interdental cleaning tool that is not too soft and is unlikely to break during use. An interdental cleaning tool according to the present invention includes: a cleaning tool body that is made of a synthetic resin, and includes a grip portion that is capable of being gripped with fingers of a user and a shaft portion that extends in one direction from the grip portion; and a cleaning portion configured to clean between teeth, covering a leading end of the shaft portion, and made of an elastomer, wherein $Y > -0.07X + 3.3$ is satisfied, where Y is a maximum torque value (N·cm) when the grip portion is rotated at a rotational speed of 10 rpm about a position located 15 mm away from a leading end of the cleaning portion, and X is a rotational angle (degrees) when the maximum torque value is measured.

4 Claims, 9 Drawing Sheets

(58) Field of Classification Search
CPC .. A46B 2200/108; A46B 9/005; A45D 40/262
See application file for complete search history.

(56) References Cited

U.S. PATENT DOCUMENTS

| | | | | |
|---|---|---|---|---|
| 2015/0335141 A1* | 11/2015 | Schär | .................. | A46B 5/02 |
| | | | | 15/159.1 |
| 2017/0319309 A1 | 11/2017 | Gengyo et al. | | |
| 2018/0168783 A1* | 6/2018 | Kato | .................. | A46B 3/005 |
| 2019/0125506 A1* | 5/2019 | Butz | .................. | A46B 15/0069 |
| 2019/0192265 A1 | 6/2019 | Kikkawa et al. | | |

FOREIGN PATENT DOCUMENTS

| | | | | |
|---|---|---|---|---|
| JP | 2018-57841 A | 4/2018 | | |
| JP | 2018-88514 A | 5/2018 | | |
| WO | WO-0211582 A1 * | 2/2002 | .......... | A46B 5/0025 |
| WO | WO 2013/176297 A1 | 11/2013 | | |
| WO | WO 2016/076241 A1 | 5/2016 | | |

OTHER PUBLICATIONS

JP2016131899A. Translation (Year: 2016).*
Tooth brush, Yasushi Okuda, WO0211582A1. (Year: 2002).*
JIS K7171. "https://www.shimadzu.com/an/products/materials-testing/uni-ttm-system/flexural-test-methods-for-plastics-iso-178-and-jis-k-7171/index.html". (Year: 2008).*
Japanese Office Action for Japanese Application No. 2018-125596, dated Nov. 8, 2022 with an English translation.
Extended European Search Report for European Application No. 19826467.3, dated May 23, 2022.
International Search Report, issued in PCT/JP2019/019549, dated Jul. 9, 2019.
Written Opinion of the International Searching Authority, issued in PCT/JP2019/019549, dated Jul. 9, 2019.
Japanese Office Action for Japanese Application No. 2018-125596, dated May 10, 2022, with English translation.
English translation of the Japanese Office Action for corresponding Japanese Application No. 2018-125596, dated Jul. 4, 2023.

* cited by examiner

| | Size SSSSS-SS | | | | | |
|---|---|---|---|---|---|---|
| | Ex. 1 | Ex. 2 | Ex. 3 | Ex. 4 | Ex. 5 | Ex. 6 |
| Flexural strength (MPa) | 124 | 143 | 136 | 170 | 146 | 116 |
| Modulus of elasticity in bending (MPa) | 5410 | 6330 | 5880 | 7910 | 6640 | 5900 |
| Evaluation | 1 | 1 | 1 | 2 | 2 | 2 |

| Angle | Maximum torque | Angle | Maximum torque | Angle | Maximum torque | Angle | Maximum torque | Angle | Maximum torque | Angle | Maximum torque |
|---|---|---|---|---|---|---|---|---|---|---|---|
| 41.3 | 2.01 | 40.2 | 1.71 | 40.1 | 1.75 | 29.1 | 2.12 | 33.3 | 1.71 | 36.5 | 1.88 |
| 42.4 | 1.94 | 39.5 | 2 | 40.4 | 1.94 | 30.5 | 2.29 | 32.4 | 1.88 | 34.4 | 1.73 |
| 42.3 | 1.98 | 40.3 | 1.75 | 39.3 | 1.86 | 31 | 2.18 | 34 | 1.8 | 33.5 | 1.73 |
| 41.3 | 1.87 | 37.9 | 1.89 | 40.6 | 1.75 | 28.3 | 1.98 | 33.9 | 1.82 | 36.4 | 1.8 |
| 40 | 1.85 | 37.6 | 1.97 | 44 | 1.84 | 30.1 | 2.16 | 33.4 | 1.83 | | |
| 40 | 1.98 | 42.7 | 1.97 | | | 29.4 | 2.19 | 34.3 | 1.98 | | |
| 42.9 | 2 | | | | | 28.8 | 2.08 | 31 | 1.9 | | |
| 40.1 | 1.89 | | | | | 30.5 | 2.17 | 32.2 | 1.85 | | |
| | | | | | | 30.3 | 2.06 | 35 | 1.82 | | |
| | | | | | | 30 | 2.06 | 36.1 | 1.94 | | |
| | | | | | | 28.5 | 1.86 | 32.8 | 1.96 | | |
| | | | | | | 30.3 | 2.19 | 33.8 | 1.83 | | |
| | | | | | | 32.2 | 2.13 | 34 | 1.9 | | |
| | | | | | | 28.6 | 2.06 | 33.2 | 1.99 | | |
| | | | | | | 31.4 | 2.26 | 34.5 | 1.95 | | |
| | | | | | | 30.6 | 2.07 | | | | |
| | | | | | | 32.6 | 2.07 | | | | |

Fig. 8

| | Size SSS-S | | | | | | | | | | | | |
|---|---|---|---|---|---|---|---|---|---|---|---|---|---|
| | Ex. 7 | | Ex. 8 | | Ex. 9 | | Ex. 10 | | Ex. 11 | | Ex. 12 | | Ex. 13 |
| Flexural strength(MPa) | 124 | | 143 | | 136 | | 170 | | 116 | | 124 | | 95 |
| Modulus of elasticity in bending(MPa) | 5410 | | 6330 | | 5880 | | 7910 | | 5900 | | 6200 | | 7200 |
| Evaluation | 1 | | 1 | | 1 | | 1 | | 2 | | 1 | | 2 |
| | Angle | Maximum torque | Angle | Maximum torque | Angle | Maximum torque | Angle | Maximum torque | Angle | Maximum torque | Angle | Maximum torque | Angle | Maximum torque |
| | 44.9 | 1.84 | 43.9 | 1.91 | 41.6 | 1.83 | 36.3 | 2.05 | 39.6 | 1.61 | 45.4 | 1.91 | 41.7 | 1.47 |
| | 45.9 | 1.88 | 39.8 | 1.84 | 46.5 | 1.98 | 38.7 | 2.21 | 36.4 | 1.51 | 42.3 | 1.85 | 38.7 | 1.37 |
| | 44 | 1.89 | 43.3 | 1.9 | 41.6 | 1.89 | 37.1 | 2.24 | 34.9 | 1.53 | 51.5 | 1.89 | 41.3 | 1.33 |
| | 42.8 | 1.9 | 40.8 | 1.83 | 45.3 | 1.9 | 36.8 | 2.32 | 34.8 | 1.52 | 41.9 | 1.8 | 42.9 | 1.47 |
| | 41.8 | 1.62 | 43.8 | 1.8 | 41.6 | 1.92 | 38 | 2.25 | 41 | 1.54 | 44.5 | 1.74 | 36.6 | 1.35 |
| | 43.8 | 1.74 | 44.3 | 2.02 | 43.5 | 1.92 | 36.3 | 2.34 | 36.1 | 1.66 | 44.2 | 1.9 | 42.9 | 1.44 |
| | 43.7 | 1.8 | 41.1 | 1.99 | 42.7 | 1.95 | 38.1 | 2.31 | 40 | 1.52 | 45.9 | 1.77 | | |
| | 48.2 | 1.72 | 43.5 | 1.95 | | | 35.4 | 2.08 | 38.6 | 1.61 | 48.6 | 1.87 | | |
| | 45.9 | 1.92 | 43.8 | 1.92 | | | | | 36.3 | 1.64 | 42.2 | 1.77 | | |
| | 46.4 | 1.79 | | | | | | | | | | | | |

Fig. 9

| | | Ex. 14 | | Ex. 15 | | Ex. 16 | | Ex. 17 | | Ex. 18 | | Size SS-M Ex. 19 | | Ex. 20 | | Ex. 21 | | Ex. 22 | | Com. Ex. 4 | |
|---|---|---|---|---|---|---|---|---|---|---|---|---|---|---|---|---|---|---|---|---|---|
| Flexural strength (MPa) | | 124 | | 124 | | 157 | | 151 | | 130 | | 125 | | 130 | | 130 | | 95 | | 63 | |
| Modulus of elasticity in bending (MPa) | | 5410 | | 6200 | | 7300 | | 6800 | | 7300 | | 6610 | | 7600 | | 6447 | | 7200 | | 4500 | |
| Evaluation | | 1 | | 1 | | 1 | | 1 | | 2 | | 1 | | 3 | | 3 | | 2 | | 4 | |
| | | Angle | Maximum torque | Angle | Maximum torque | Angle | Maximum torque | Angle | Maximum torque | Angle | Maximum torque | Angle | Maximum torque | Angle | Maximum torque | Angle | Maximum torque | Angle | Maximum torque | Angle | Maximum torque |
| | | 48.9 | 1.94 | 37.4 | 2.01 | 36.8 | 2.67 | 40.8 | 2.35 | 31.3 | 1.89 | 43.4 | 1.57 | 26.4 | 1.68 | 27.0 | 1.92 | 37.9 | 1.76 | 28.1 | 1.27 |
| | | 51.5 | 2.22 | 36.4 | 2.20 | 36.3 | 2.57 | 36.8 | 2.38 | 31.8 | 2.24 | 41.9 | 1.61 | 30.0 | 1.75 | 26.2 | 1.78 | 37.6 | 1.73 | 27.5 | 1.19 |
| | | 46.5 | 2.11 | 43.7 | 2.18 | 37.6 | 2.44 | 39.7 | 2.44 | 30.5 | 2.17 | 45.5 | 1.68 | 28.9 | 1.58 | 26.8 | 1.87 | 36.3 | 1.87 | 29.0 | 1.18 |
| | | 45.5 | 2.19 | 41.4 | 2.15 | 38.6 | 2.43 | 38.2 | 2.47 | 30.2 | 2.06 | 46.7 | 1.62 | 29.0 | 1.58 | 28.8 | 1.90 | 36.3 | 1.67 | 29.5 | 1.17 |
| | | 44.4 | 2.08 | 38.9 | 2.08 | 38.2 | 2.56 | 36.0 | 2.38 | 28.5 | 2.11 | 41.7 | 1.66 | 29.5 | 1.58 | 24.8 | 1.73 | 37.2 | 1.76 | 29.0 | 1.17 |
| | | 44.9 | 1.98 | 38.1 | 1.99 | 36.1 | 2.46 | 40.4 | 2.63 | 31.2 | 2.08 | 44.2 | 1.53 | 26.3 | 1.68 | 27.6 | 1.75 | 38.1 | 1.78 | 28.0 | 1.16 |
| | | 47 | 2.11 | 38.7 | 2.11 | 36.8 | 2.46 | 43.5 | 2.45 | | | 42.5 | 1.82 | | | 27.0 | 1.69 | | | 30.7 | 1.15 |
| | | 46.4 | 2.14 | 40.3 | 2.17 | 35.1 | 2.56 | | | | | 46.7 | 1.61 | | | | | | | 29.0 | 1.23 |
| | | 43.6 | 2.08 | 43.5 | 1.91 | 38.0 | 2.54 | | | | | 42.8 | 1.69 | | | | | | | | |
| | | 49.8 | 2 | | | 37.8 | 2.48 | | | | | 44.4 | 1.67 | | | | | | | | |

Fig. 10

|  | Size M-L ||||||
|---|---|---|---|---|---|---|
|  | Ex. 23 || Ex. 24 || Ex. 25 ||
| Flexural strength(MPa) | 124 || 124 || 130 ||
| Modulus of elasticity in bending(MPa) | 5410 || 6200 || 6447 ||
| Evaluation | 1 || 1 || 3 ||
|  | Angle | Maximum torque | Angle | Maximum torque | Angle | Maximum torque |
|  | 44.6 | 2.21 | 38.7 | 2.28 | 27 | 1.88 |
|  | 40.1 | 2.23 | 44 | 2.24 | 27.6 | 1.91 |
|  | 40 | 2.18 | 42.2 | 2.2 | 26.8 | 1.88 |
|  | 42.9 | 2.29 | 38.6 | 2.26 | 26.5 | 1.97 |
|  | 43.6 | 2.13 | 39 | 2.09 | 25 | 1.77 |
|  | 43.8 | 2.24 | 37.1 | 2.05 | 26.8 | 1.89 |
|  | 40 | 2.24 | 39.1 | 2.3 | 23.9 | 1.8 |
|  | 45.5 | 2.34 | 40.7 | 2.33 | 23.3 | 1.82 |
|  | 45.4 | 2.27 | 41.7 | 2.39 | 28.1 | 1.87 |
|  | 49.1 | 2.11 |  |  | 26.2 | 1.71 |

INTERDENTAL CLEANING TOOL

TECHNICAL FIELD

The present invention relates to an interdental cleaning tool.

BACKGROUND ART

Conventionally, various types of interdental cleaning tools have been proposed, and an interdental cleaning tool as follows is disclosed in Patent Literature 1 as one such interdental cleaning tool. That is to say, this interdental cleaning tool includes a cleaning tool body in which a grip portion that is capable of being gripped with fingers and a shaft portion that extends in one direction from the grip portion are made of a resin material as one piece, wherein a leading end of the shaft portion is covered with a resin cleaning portion having a brush.

CITATION LIST

Patent Literature

Patent Literature 1: WO 2013/176297

SUMMARY OF INVENTION

Technical Problem

Incidentally, the cleaning portion of this sort of interdental cleaning tool is inserted between teeth in a state in which the grip portion is gripped with fingers, and the shaft portion is bent at various angles depending on the position of teeth between which the cleaning portion is inserted. For example, when the cleaning portion is inserted between back teeth, the shaft portion is bent at approximately 90 degrees, and the cleaning of the areas in between the teeth is performed in this state.

In this manner, the shaft portion is bent at various angles depending on the position of the teeth, and thus it needs to be hard so as not to break even when being significantly bent. Meanwhile, a shaft portion that is too soft is problematic in that it is difficult to transmit force during the cleaning of teeth, which deteriorates the usability. The present invention has been made in order to solve the above-described problem, and it is an object thereof to provide an interdental cleaning tool that is not too soft and is unlikely to break during use.

Solution to Problem

The present invention is directed to an interdental cleaning tool including: a cleaning tool body that is made of a synthetic resin, and includes a grip portion that is capable of being gripped with fingers of a user and a shaft portion that extends in one direction from the grip portion; and a cleaning portion configured to clean between teeth, covering a leading end of the shaft portion, and made of an elastomer, wherein $Y > -0.07X + 3.3$ is satisfied, where Y is a maximum torque value (N·cm) when the grip portion is rotated at a rotational speed of 10 rpm about a position located 15 mm away from a leading end of the cleaning portion, and X is a rotational angle (degrees) when the maximum torque value is measured.

It is preferable that the above-described interdental cleaning tool is such that $Y > -0.07X + 3.9$ is satisfied.

It is particularly preferable that the above-described interdental cleaning tool is such that $Y > -0.07X + 4.5$ is satisfied.

It is also possible that the above-described interdental cleaning tool is such that the cleaning tool body contains a glass fiber.

Advantageous Effects of Invention

The interdental cleaning tool according to the present invention is not too soft and is unlikely to break during use.

BRIEF DESCRIPTION OF DRAWINGS

FIG. 9 is a table showing property values such as bending properties of interdental cleaning tools according to Examples 13 to 22 and Comparative Example;

DESCRIPTION OF EMBODIMENTS

Figure 1:
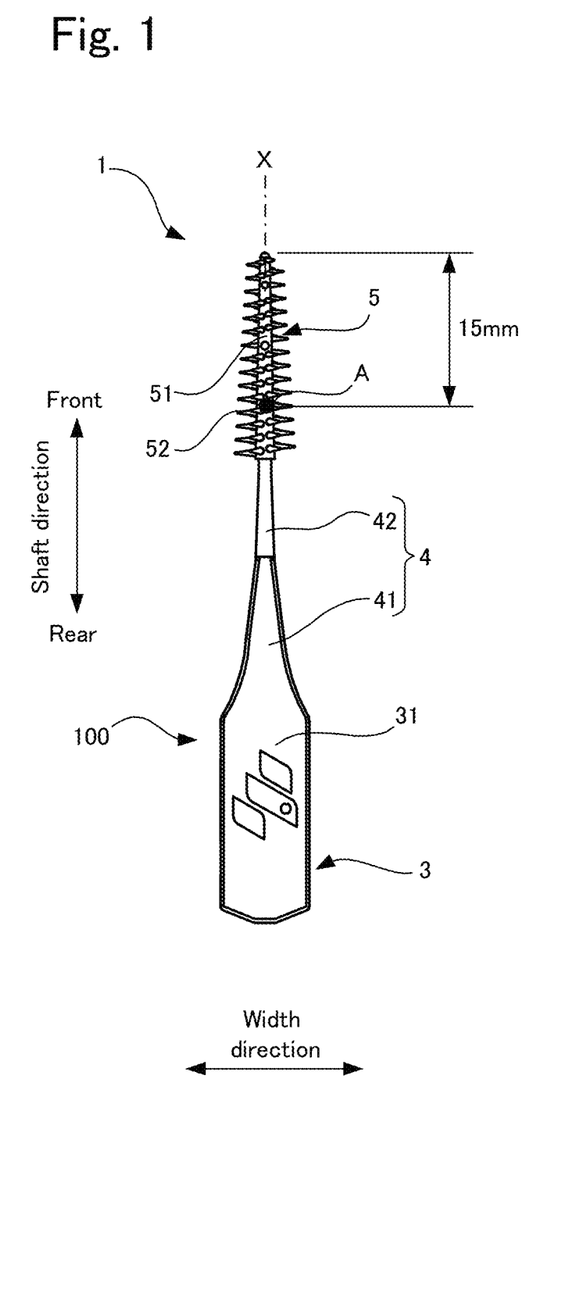
FIG. 1 is a plan view of an interdental cleaning tool according to an embodiment of the present invention.
Figure 2:
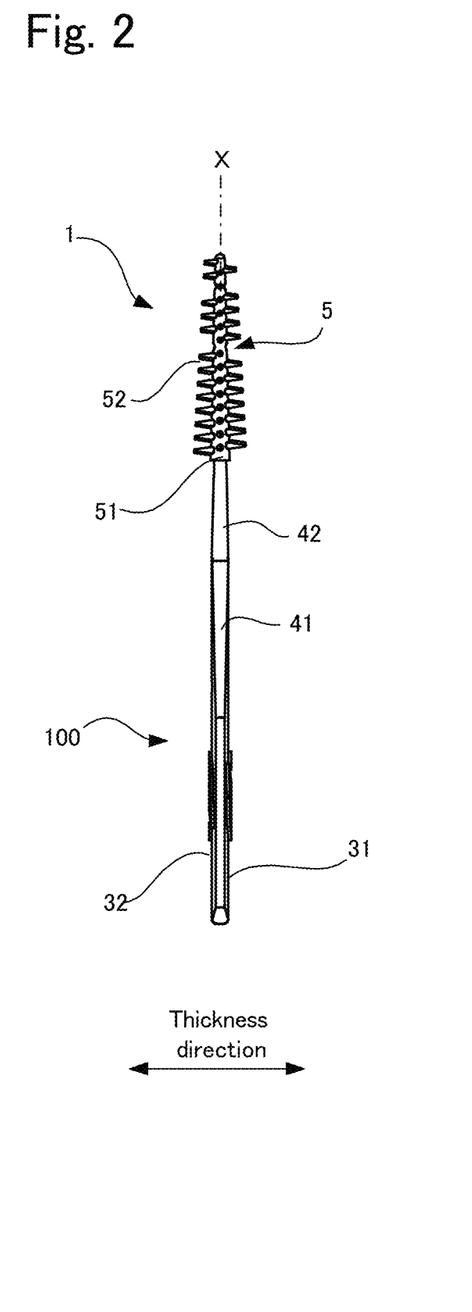
FIG. 2 is a side view of FIG. 2.

Hereinafter, an embodiment of an interdental cleaning tool according to the present invention will be described with reference to the drawings. FIG. 1 is a plan view of the interdental cleaning tool, and FIG. 2 is a side view of FIG. 1. For the sake of ease of description, the description below will be given based on the directions in the drawings. In the directions, the left-right direction in FIG. 1 may be alternatively referred to as a width direction or a left-right direction, and the upper side in FIG. 1 may be alternatively referred to as a leading end side or a front side. Note that the present invention is not limited to the definition of these directions.

1. Interdental Cleaning Tool

As shown in FIGS. 1 and 2, an interdental cleaning tool 1 includes a cleaning tool body 100 having a plate-like grip portion 3 that is capable of being gripped with fingers and a shaft portion 4 that extends from an end of the grip portion 3. A cleaning portion 5 formed in the shape of a brush is attached to the leading end of the shaft portion 4. In the description below, the direction in which the shaft portion 4 extends is taken as a shaft direction (one direction) or a front-rear direction, the side on which the cleaning portion 5 is provided is taken as a front end or a leading end, and the side that opposite thereto is taken as a rear end. Furthermore, the direction that is orthogonal to the shaft direction in the planar direction of the plate-like grip portion 3 is taken as a width direction or a left-right direction, and the direction in which the two faces of the plate-like grip portion 3 are linked to each other is taken as a thickness direction.

The grip portion 3 is formed in the shape of a rectangular plate in a plan view, and has a first face 31 and a second face 32 that face each other in the thickness direction.

Next, the shaft portion 4 will be described. The shaft portion 4 includes a first region 41 that continues from the leading end of the grip portion 3 and a second region 42 that continues from the leading end of the first region 41, and these two regions 41 and 42 are formed as one piece. The first region 41 is formed in the shape of a triangle with a width in the left-right direction that decreases toward the front side from the leading end of the grip portion 3 in a plan view. The second region 42 is formed in the shape of a rod that extends in the front-rear direction from the leading end of the first region 41, the rod having a width that slightly decreases toward the leading end. There is no particular limitation on the length of the shaft portion 4, but it may be 10 to 60 mm, for example.

The grip portion 3 and the shaft portion 4 are made of a resin material as one piece. Examples of the resin material that can be used include polypropylene, ABS, polybutylene terephthalate, polycarbonate, polyethylene terephthalate, polystyrene, and polyacetal. Furthermore, these materials may contain a glass fiber. The proportion of the glass fiber mixed in is preferably 15 to 35%, more preferably 20 to 30%, and particularly preferably 25 to 30%, for example.

Next, the cleaning portion 5 will be described. The cleaning portion 5 includes a cover portion 51 in the shape of a thin film that covers the outer circumferential face of the second region 42 of the shaft portion 4 over the area from the vicinity of the middle in the shaft direction thereof to the leading end, and a large number of bristles 52 that function as a brush projecting from the outer circumferential face of the cover portion 51 in directions that are orthogonal to the shaft direction, wherein these constituent elements are formed as one piece. The bristles 52 are arranged on the outer circumferential face of the cover portion 51 at predetermined intervals in the front-rear direction, and a plurality of such lines in the front-rear direction are formed throughout the circumferential direction of the cover portion 51. Furthermore, the bristles 52 are each formed thinner toward the tip. If the cleaning portion 5 covers the shaft portion 4 in this manner, the thickness of the cleaning portion 5 is greater than that of the cleaning tool body 100 including the grip portion 3.

There is no particular limitation on the outer diameter of the cleaning portion 5, but, for example, it is preferable that the outer diameter of the cleaning portion 5 (including the bristles 52) at a position A located 15 mm away from the leading end of the cleaning portion is 1.5 to 5 mm, for example. Furthermore, the length in the shaft direction of the cover portion 5 is preferably 10 to 20 mm, for example.

The cleaning portion 5 may be made of an elastomer, for example. Examples of the elastomer include a styrene-based elastomer, silicone, an olefin-based elastomer, and a polyester-based elastomer.

2. Bending Properties

Next, the bending properties of the interdental cleaning tool 100 will be described. The interdental cleaning tool 100 is bent at various angles depending on the position of teeth between which the interdental cleaning tool is inserted, and removes impurities such as plaque by being moved back and forth in that bent state. Accordingly, if the interdental cleaning tool 100 breaks when being bent or is too soft when being bent, the usability deteriorates. Thus, in the interdental cleaning tool 100 according to the present invention, the bending properties of the interdental cleaning tool 100 is prescribed as follows.

Figure 3:
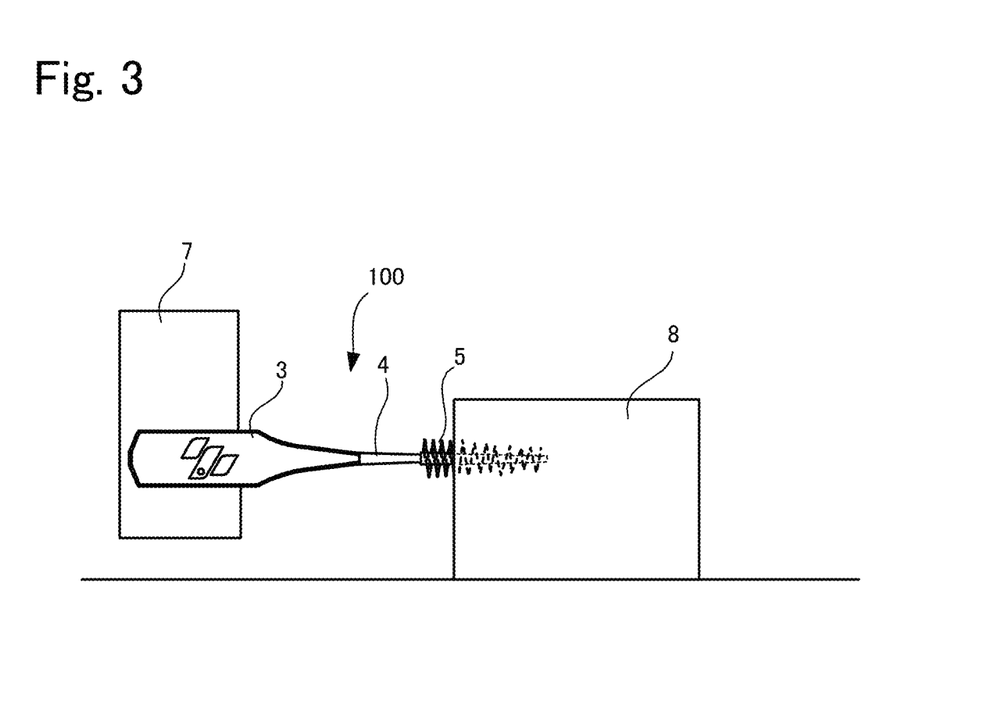
FIG. 3 is a front view of an apparatus for measuring a maximum torque value and an angle thereof when the interdental cleaning tool is bent.
Figure 4:
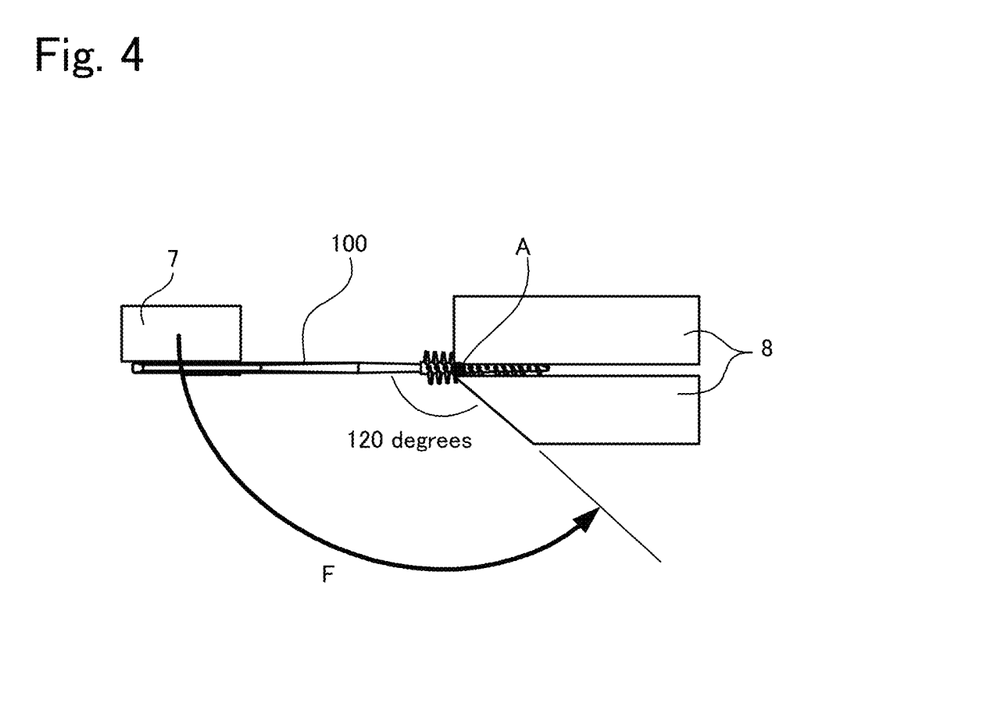
FIG. 4 is a plan view of FIG. 3.

First, as shown in FIGS. 3 and 4, the cleaning portion 5 is fixed by a jig 8 over the area from the leading end to the position A, which is a position located 15 mm away in the shaft direction from the leading end. The leading end of the cleaning portion 5 is also the leading end of the interdental cleaning tool. At this time, the cleaning portion is fixed such that the width direction of the grip portion 3 matches the vertical direction and such that the area of the interdental cleaning tool 100 that is located closer to the rear end than the position A is project from the jig 8.

Next, the grip portion 3 is pressed by an electric torque meter 7, and the grip portion 3 is rotated about the position A by 120 degrees (the arrow F in FIG. 4) in the horizontal direction at a rotational speed of 10 rpm. Accordingly, the shaft portion 4 breaks. Then, an interdental cleaning tool in which a relationship between a maximum torque value Y (N·cm) during the rotation by 120 degrees (immediately before the shaft portion 4 breaks), and a rotational angle X (degrees) when the maximum torque value Y is measured, satisfies the following expression (1):

$$Y > -0.07X + 3.3 \quad (1)$$

is taken as the interdental cleaning tool 100 according to the present invention.

As described above, the interdental cleaning tool 100 is used in a bent state, and thus it is preferable that the tool can be bent as much as possible without breaking. That is to say, it is preferable that the rotational angle X up to when the maximum torque value is measured is as large as possible. Meanwhile, a maximum torque value Y that is too small is problematic in that it is difficult to transmit force to the cleaning portion 5 because the interdental cleaning tool 100 that is to be bent is too soft. Accordingly, the shaft portion 4 of the interdental cleaning tool 100 and the cleaning portion 5 that covers the shaft portion needs to be hard to a certain extent and, the maximum torque value Y is preferably large to a certain extent. That is to say, the interdental cleaning tool 100 needs to be both flexible and hard when being bent.

Note that the reason why the position A located 15 mm away from the leading end is set to a rotational center is because, in the cleaning of the areas in between teeth, an interdental cleaning tool is typically inserted between the teeth up to a length of approximately 15 mm from the leading end, and the shaft portion 4 is bent in that inserted state.

Thus, as shown in the following examples, it was seen from evaluations by users that an interdental cleaning tool 100 that satisfies the expression (1) above is unlikely to break even when being bent during use, and has a hardness suitable for use. Also, it was seen from evaluations by users that an interdental cleaning tool 100 that satisfies an expression (2) below has a better usability, and an interdental cleaning tool 100 that satisfies an expression (3) below has a particularly better usability.

$$Y > -0.07X + 3.9 \quad (2)$$

$$Y > -0.07X + 4.5 \quad (3)$$

Furthermore, it is preferable that the interdental cleaning tool 100 according to the present invention is set to have a flexural strength and a modulus of elasticity in bending within prescribed ranges in addition to the bending properties shown in the expressions (1) to (3) above. That is to say, the flexural strength of the interdental cleaning tool 100 according to the present invention is preferably 90 to 175 MPa, more preferably 110 to 160 MPa, and particularly preferably 120 to 150 MPa. The flexural strength is measured as defined by JIS K7171.

The modulus of elasticity in bending of the interdental cleaning tool 100 is preferably 4600 to 8500 MPa, more preferably 5400 to 7500 MPa, and particularly preferably 5800 to 6500 MPa. The modulus of elasticity in bending is measured as defined by JIS K7171.

7. Modified Examples

Although an embodiment of the present invention has been described above, the present invention is not limited to the embodiment above, and various modifications can be made within the scope not departing from the gist of the invention. Note that the following modified examples may be combined as appropriate.

Although the interdental cleaning tool 1 includes the grip portion 3 and the shaft portion 4 that are formed as one piece, they may be separate parts. Furthermore, there is no particular limitation on the shape of the grip portion, as long as it allows the grip portion to be gripped with fingers. Also, there is no particular limitation on the configuration of the cleaning portion 5, as long as it has a shape that enables the cleaning portion to scrape out plaque between teeth, such as the above-described brush-like shape.

Examples

Hereinafter, examples of the interdental cleaning tool according to the present invention will be described. Note that the present invention is not limited to the following examples.

Figure 5:
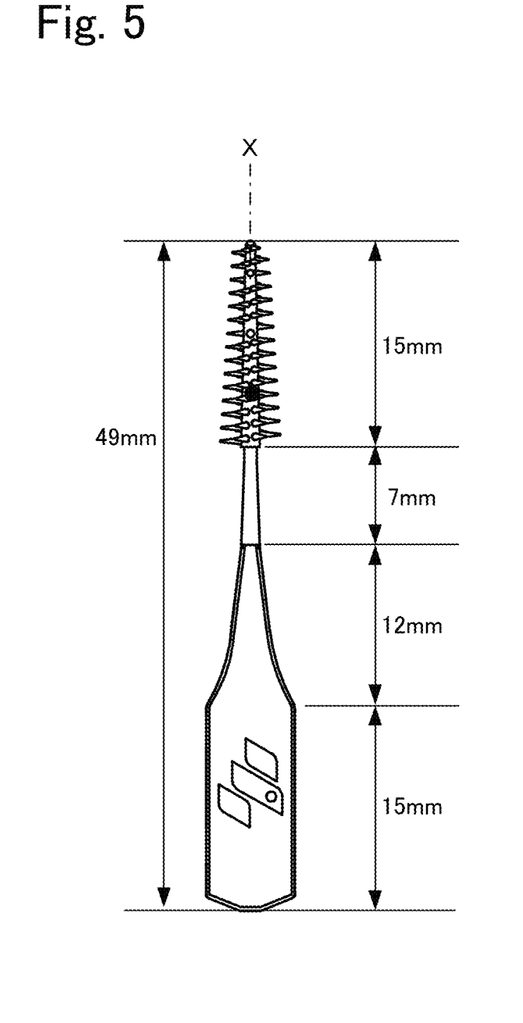
FIG. 5 is a plan view of an interdental cleaning tool according to examples and a comparative example.
Figure 6:
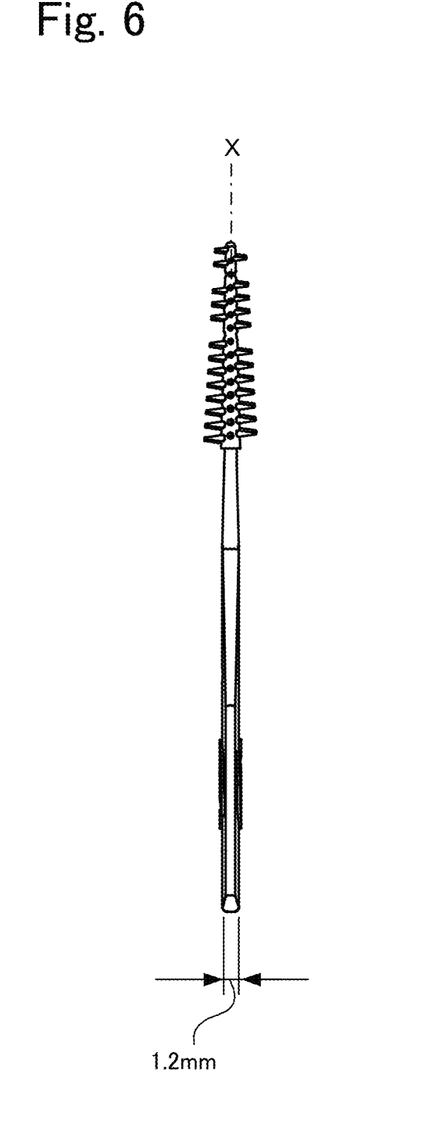
FIG. 6 is a side view.
Figure 7:
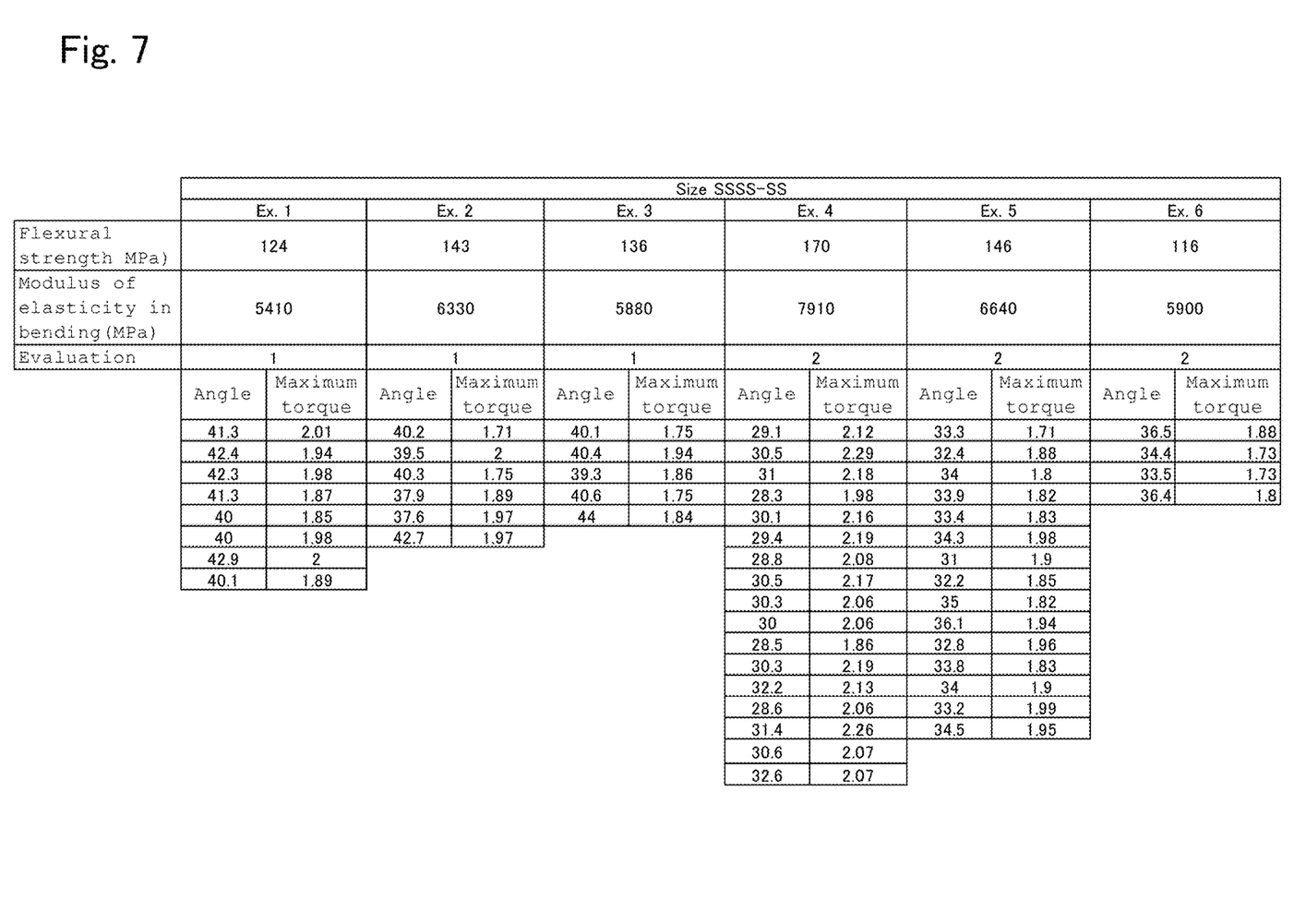
FIG. 7 is a table showing property values such as bending properties of interdental cleaning tools according to Examples 1 to 6.
Figure 8:
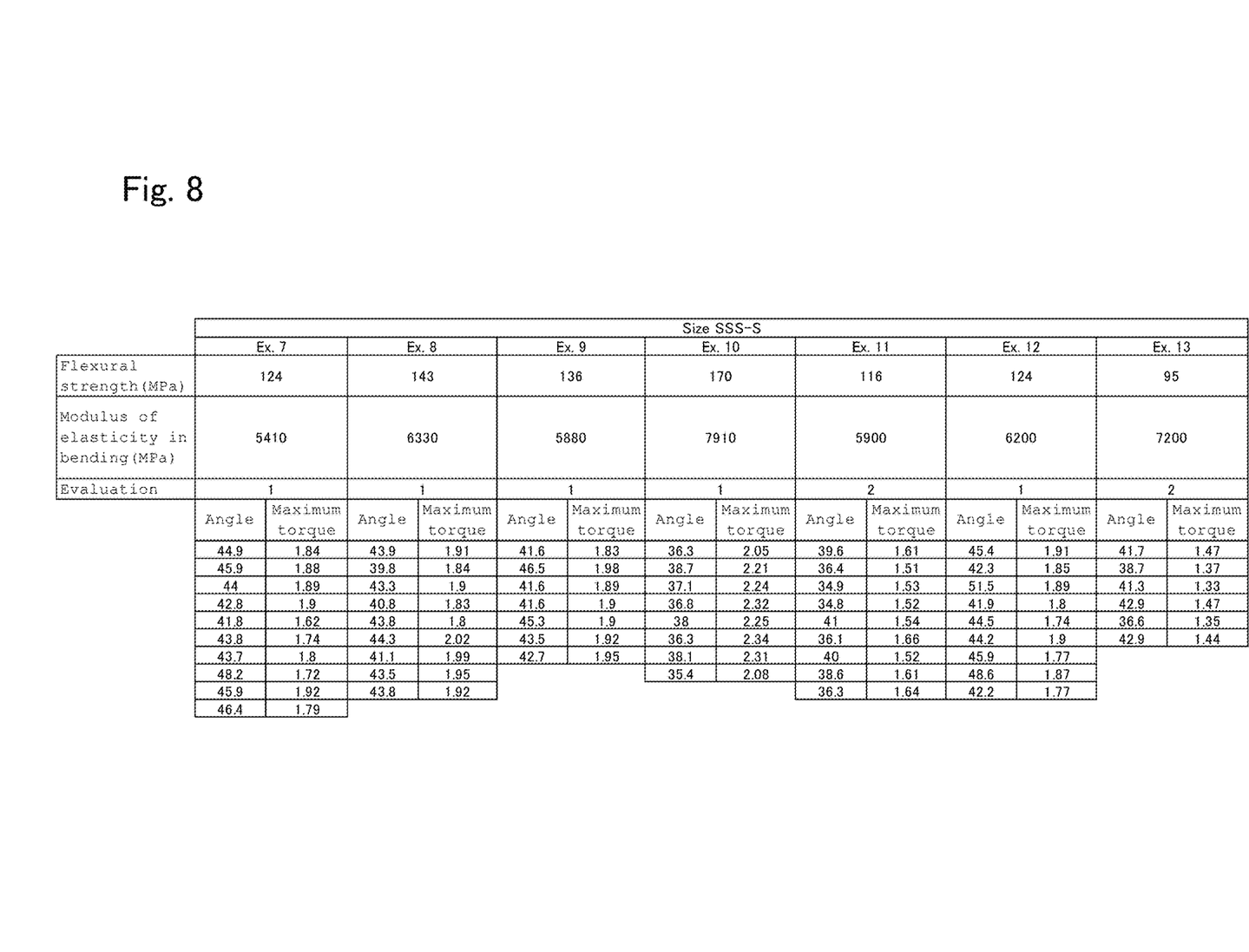
FIG. 8 is a table showing property values such as bending properties of interdental cleaning tools according to Examples 7 to 13.
Figure 10:
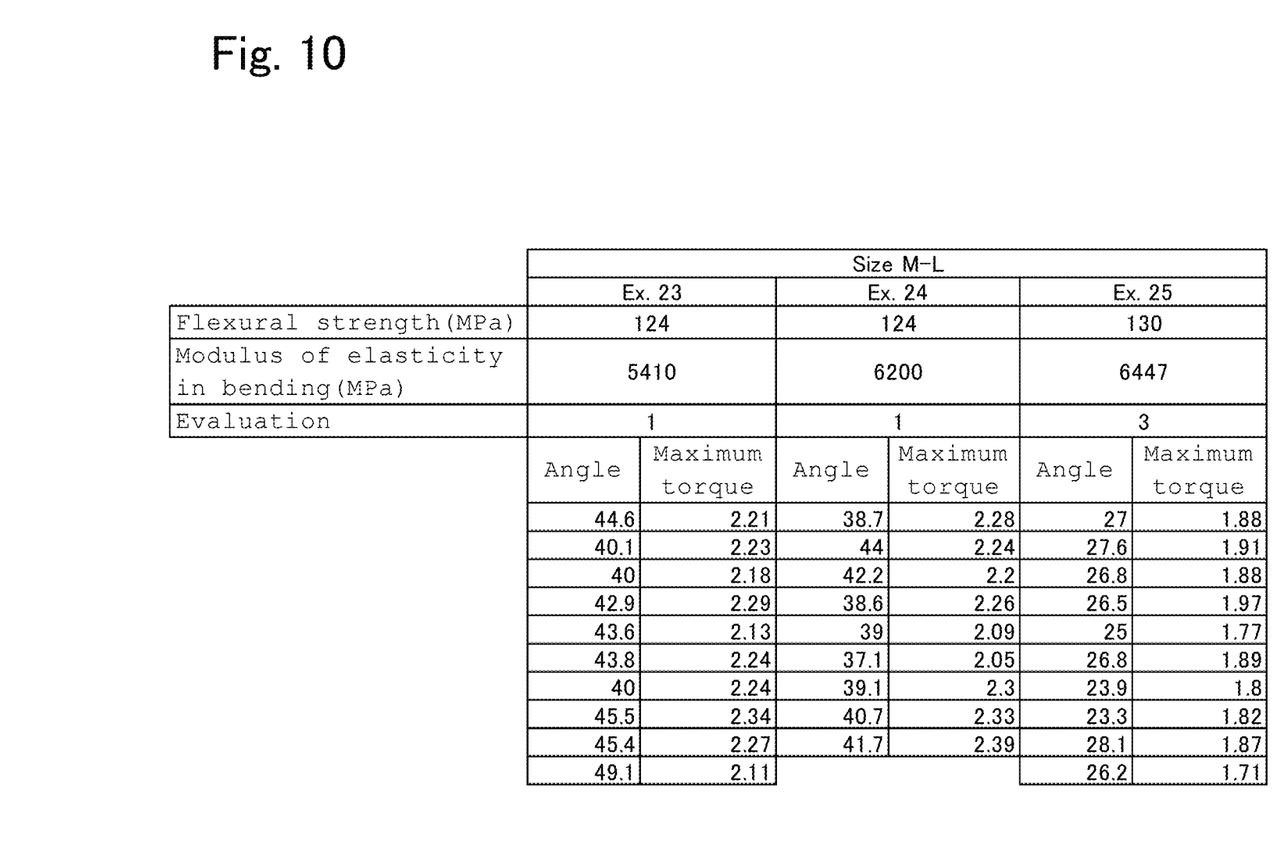
FIG. 10 is a table showing property values such as bending properties of interdental cleaning tools according to Examples 23 to 25.

In the following examples, interdental cleaning tools according to Examples 1 to 25 and the Comparative Example having the same shape as that of the foregoing embodiment but made of resin materials mentioned above with various flexural strengths and moduli of elasticity in bending were produced. Note that, in consideration of dimensional tolerances and the like, a plurality of sets of the interdental cleaning tools according to the examples and the comparative example were produced (see FIGS. 7 to 10). Furthermore, the interdental cleaning tools according to the examples and the comparative example had dimensions shown in FIGS. 5 and 6, but had shapes in which a shaft portion and a cleaning portion covering the shaft portion had various outer diameters. That is to say, the outer diameters at the position A of those according to Examples 1 to 6, Examples 7 to 13, Examples 14 to 22 and the Comparative Example, and Examples 23 to 25 were respectively 2.5 mm (size SSSS-SS), 3.5 mm (size SSS-S), 4 mm (size SS-M), and 4 mm (size M-L).

Next, the thus prepared tools according to the examples and the comparative example were subjected to a test regarding the bending properties described in the foregoing embodiment (the maximum torque value, the rotational angle). Furthermore, those according to the examples and the comparative example were used by males and females aged 30 to 69 years for two weeks, and evaluated. In this test, those with the size SSSS-SS (Examples 1 to 6) were used by 57 people, those with the size SSS-S (Examples 7 to 13) were used by 88 people, those with the size SS-M (Examples 14 to 22 and the Comparative Example) were used by 110 people, those with the size M-L (Examples 23 to 25) were used by 58 people, and evaluated in terms of overall satisfaction, and the examples and the comparative example were evaluated based on the results. The overall satisfaction was obtained by comprehensively evaluating the usability (ease of use, easy insertion between teeth) in five grades as follows.

Evaluation of Overall Satisfaction
(i) Satisfied
(ii) Moderately satisfied
(iii) Neither satisfied nor dissatisfied
(iv) Moderately dissatisfied
(v) Dissatisfied The examples and the comparative example were evaluated based on the proportions of the number of people who determined that the tool was satisfactory or moderately satisfactory in the five-grade evaluation.

The evaluation of the examples and the comparative example was as follows.

Evaluation 1: The proportion of satisfactory or moderately satisfactory is 80% or more
Evaluation 2: The proportion of satisfactory or moderately satisfactory is 70% or more and less than 80%
Evaluation 3: The proportion of satisfactory or moderately satisfactory is 60% or more and less than 70%
Evaluation 4: The proportion of satisfactory or moderately satisfactory is less than 60%

Figure 11:
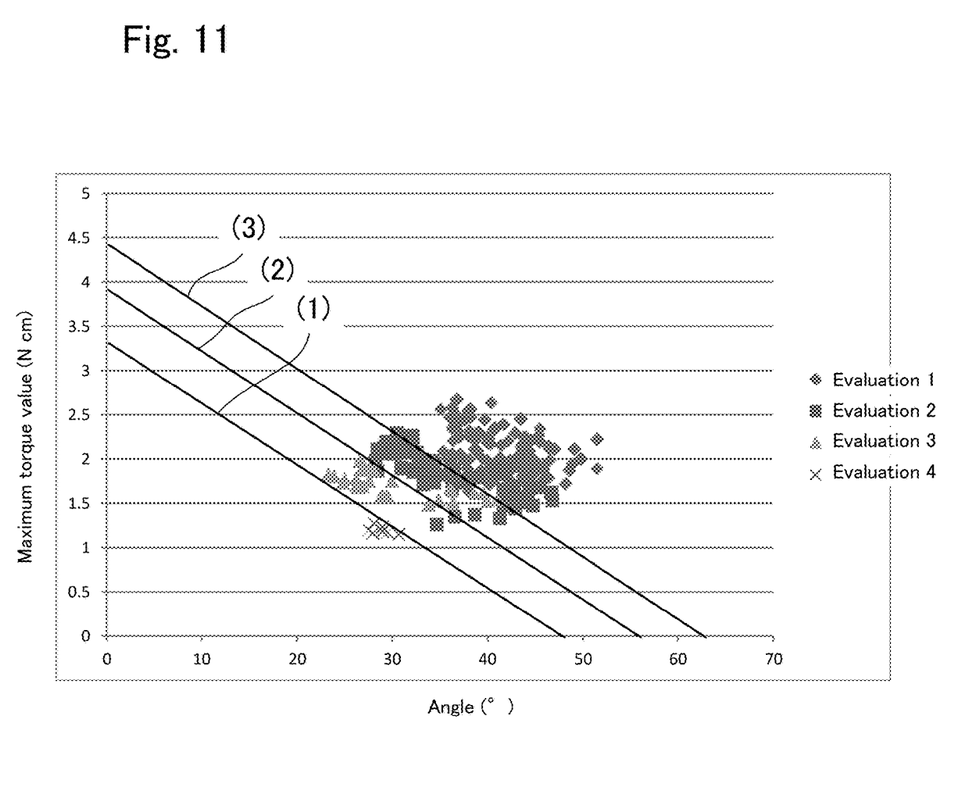
FIG. 11 is a graph showing a distribution of maximum torque values of interdental cleaning tools according to the examples and the comparative example, and angles thereof.
Figure 12:
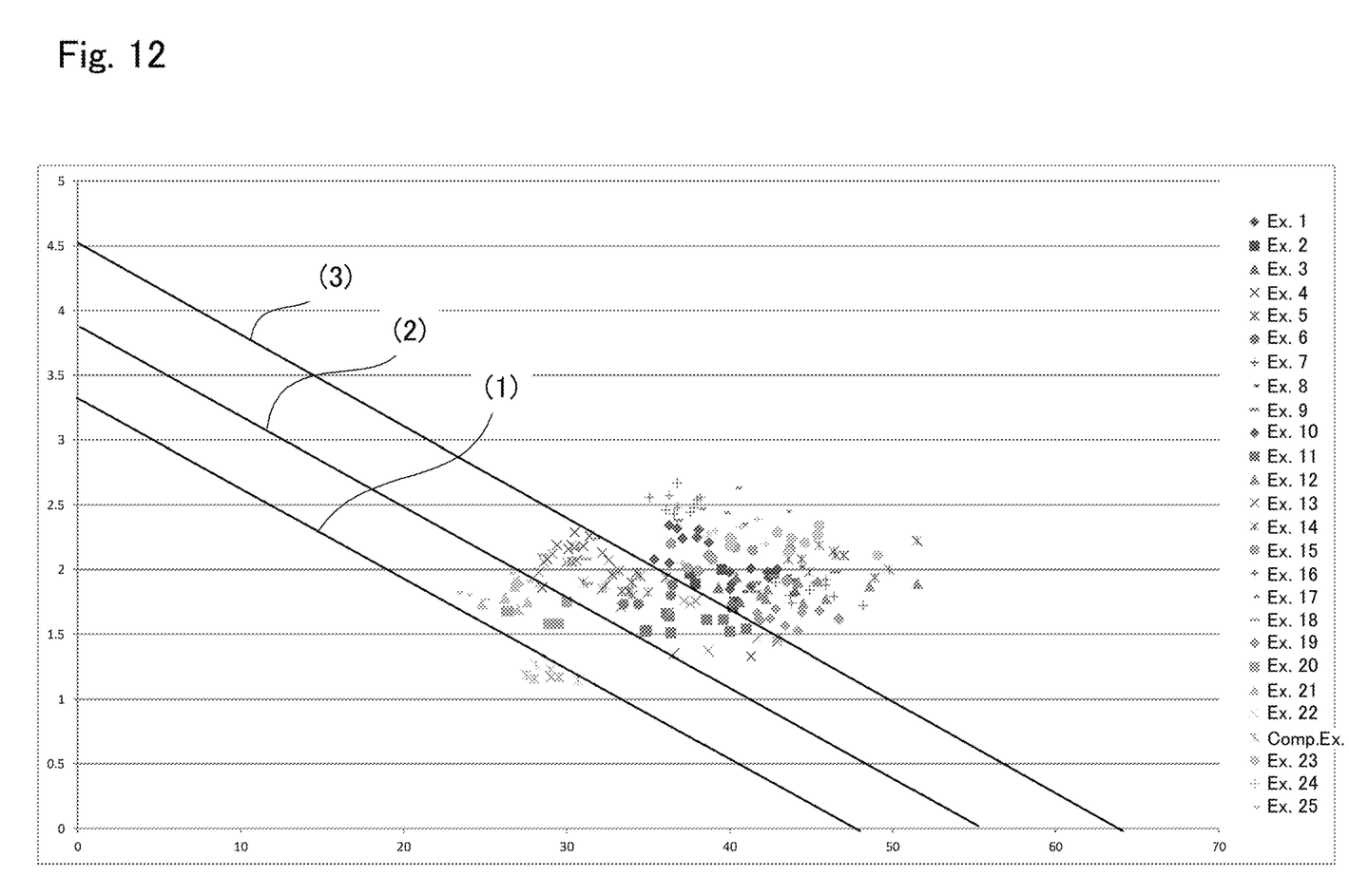
FIG. 12 is a graph showing a distribution of maximum torque values of interdental cleaning tools according to the examples and the comparative example, and angles thereof.

The result is as shown in FIGS. 7 to 10. Furthermore, FIG. 11 shows a distribution of maximum torque values and angles thereof in Examples 1 to 25 and the Comparative Example, for each of Evaluations 1 to 4 above. Furthermore, FIG. 12 shows a distribution of maximum torque values and angles thereof, for each of the examples and the comparative example. FIGS. 11 and 12 show the expressions (1) to (3) described in the foregoing embodiment. As shown in there drawings, the Comparative Example rated as Evaluation 4 does not satisfy the expression (1). Examples 20, 21, and 25 rated as Evaluation 3 satisfy the expression (1). Examples 4 to 6, 11, 13, 18, and 22 rated as Evaluation 2 satisfy the expression (2), and Examples 1 to 3, 7 to 10, 12, 14 to 17, 19, 23, and 24 rated as Evaluation 1 satisfy the expression (3).

The interdental cleaning tool that satisfies the expression (1) has a satisfactory usability for users. It was found that the usability for users increases in accordance with the tool satisfying the expression (2) and the expression (3).

LIST OF REFERENCE NUMERALS

100 Interdental cleaning tool
3 Grip portion
4 Shaft portion
5 Cleaning portion

The invention claimed is:
1. An interdental cleaning tool comprising:
a cleaning tool body that is made of a synthetic resin, and includes a grip portion that is capable of being gripped with fingers of a user and a shaft portion that extends in one direction from the grip portion; and
a cleaning portion configured to clean between teeth, covering a leading end of the shaft portion, and made of an elastomer, wherein the shaft portion includes a first region that continues from a leading end of the grip portion and a second region that continues from the leading end of the first region, the first region is formed in the shape of a substantially triangle, and the second region is formed in the shape of a rod, a length in the second region from the first region to the cleaning portion is shorter than the first region, a flexural strength of the interdental cleaning tool, measured as defined by JIS K7171, is 90 to 175 MPa, a modulus of elasticity in bending of the interdental cleaning tool, measured as defined by JIS K7171, is 4600 to 8500 MPa, and wherein Y>−0.07X+3.3 is satisfied, where Y is a maximum torque value (N·cm) when the grip portion is rotated at a rotational speed of 10 rpm about a position located 15 mm away from a leading end of the cleaning portion, and X is a rotational angle (degrees) when the maximum torque value is measured.

2. The interdental cleaning tool according to claim 1, wherein Y>0.07X+3.9 is satisfied.

3. The interdental cleaning tool according to claim 1, wherein Y>−0.07X+4.5 is satisfied.

4. The interdental cleaning tool according to claim 1, wherein the cleaning tool body contains a glass fiber.

* * * * *